(12) United States Patent
Taniguchi et al.

(10) Patent No.: US 7,347,891 B2
(45) Date of Patent: Mar. 25, 2008

(54) WATER BASE INK SET FOR INK-JET RECORDING AND METHOD FOR PRODUCING THE SAME

(75) Inventors: Akihiko Taniguchi, Haguri-gun (JP); Kazuma Goto, Nagoya (JP); Hideo Ohira, Tajimi (JP); Masaya Fujioka, Nagoya (JP); Shunichi Higashiyama, Yotsukaichi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 288 days.

(21) Appl. No.: 11/153,626

(22) Filed: Jun. 16, 2005

(65) Prior Publication Data

US 2005/0279250 A1 Dec. 22, 2005

(30) Foreign Application Priority Data

Jun. 18, 2004 (JP) .............................. 2004-181763

(51) Int. Cl.
*C09D 11/00* (2006.01)
*C09D 11/02* (2006.01)

(52) U.S. Cl. .............................. 106/31.43; 106/31.28; 106/31.32; 106/31.58; 106/31.86

(58) Field of Classification Search ............. 106/31.43, 106/31.28, 31.27, 31.32, 31.58, 31.86
See application file for complete search history.

(56) References Cited

U.S. PATENT DOCUMENTS

| | | | | |
|---|---|---|---|---|
| 5,745,140 | A | 4/1998 | Stoffel et al. ................ | 347/100 |
| 6,652,084 | B1* | 11/2003 | Teraoka et al. ........... | 106/31.13 |
| 6,758,889 | B2* | 7/2004 | Koga et al. ................ | 106/31.43 |
| 6,852,155 | B2* | 2/2005 | Koga et al. ................ | 106/31.58 |
| 6,921,429 | B2* | 7/2005 | Sago et al. ................ | 106/31.43 |
| 7,014,695 | B2* | 3/2006 | Koga et al. ................ | 106/31.43 |
| 7,147,696 | B2* | 12/2006 | Aoyama et al. .......... | 106/31.32 |
| 2004/0031419 | A1* | 2/2004 | Taniguchi et al. ....... | 106/31.59 |
| 2004/0130607 | A1* | 7/2004 | Goto et al. ................. | 347/100 |
| 2004/0227800 | A1* | 11/2004 | Ohira et al. .............. | 106/31.13 |
| 2004/0233263 | A1* | 11/2004 | Goto et al. ................. | 347/100 |

FOREIGN PATENT DOCUMENTS

JP      A 08-283631      10/1996

* cited by examiner

*Primary Examiner*—Helene Klemanski
(74) *Attorney, Agent, or Firm*—Oliff & Berridge, PLC

(57) ABSTRACT

A water base ink set for ink-jet recording includes a black ink containing water, a black pigment and a water-soluble organic solvent and a color ink containing water, a dye, and a water-soluble organic solvent. The black pigment is a negatively-chargeable and self-dispersible pigment. The dye has a fluorescein structure. The color ink further contains an alkylamine ethylene oxide adduct. The water-soluble organic solvent contained in the black ink is same as that contained in the color ink. With the ink set, not only the bleeding hardly occurs but also satisfactory discharge stability is obtained even when an ink-jet recording is performed on a regular paper.

19 Claims, 1 Drawing Sheet

WATER BASE INK SET FOR INK-JET RECORDING AND METHOD FOR PRODUCING THE SAME

BACKGROUND OF THE INVENTION

1. Field of the Invention

The present invention relates to a water base ink set for ink-jet recording in which at least a black ink and a color ink are used in combination, and a method for producing the water base ink set.

2. Description of the Related Art

Dye water base inks, containing a water-soluble dye as the coloring agent which is excellent in handling performance, and which hardly deposit precipitates and exhibit satisfactory color vividness or brightness, have been hitherto widely used for the ink-jet recording. At the same time, it is more demanded that the ink-jet recording is performed on a regular paper rather than an exclusive ink-jet paper, thereby decreasing the running cost for printing operation. In general, the water base ink is easily absorbed in the regular paper and thus likely to blur on the regular paper. Accordingly, when an ink-jet recording is performed on the regular paper with such a dye water base ink, the problem of the bleeding is likely to occur. The bleeding refers to such a phenomenon that the printing quality deteriorates at a portion in which different colors are adjacent to each other because the inks having different colors are blurred and mixed with each other at the portion. In particular, the bleeding between black and color inks is a major cause of the deterioration of printing quality.

In order to prevent the bleeding and thus improve the printing quality, it has been suggested, for example, to use a water-immiscible black pigment as the coloring agent so as to control the movement of color material of the black ink on the paper surface (the specification of U.S. Pat. No. 5,745,140). On the other hand, for the purpose of improving the permeability of the dye water base color ink to the inside of the paper, it has been suggested to blend a permeating agent such as a water-soluble polyvalent alcohol alkyl ether and a surfactant into the ink in order to decrease the surface tension of the ink (Japanese Patent Application Laid-open No. 8-283631).

The black pigments used in the black ink for ink-jet recording are generally classified into the following two types by the way the black pigments are dispersed in the water. One type is a dispersing agent-aided dispersion pigment with which a dispersant agent such as a surfactant and a water-soluble high molecular compound are used. The other type is a self-dispersible pigment in which a surface oxidation treatment or the like is applied to the pigment particles such as carbon black so that the surfaces of the pigment particles are charged to have a negative electric charge, and thus the pigment particles can be dispersed in the water by themselves.

There is, however, a following problem associated with the dispersing agent-aided dispersion pigment. The dispersing agent used for preparing a black ink with the dispersing agent-aided dispersion pigment facilitates the action of the black ink to permeate into the paper, which in turn causes any non-uniform blurring. In addition, when the water content in the ink is decreased after the evaporation of water, the dispersing agent causes the ink to solidify. On the other hand, the self-dispersible pigment, in which the dispersion stability relies only on the electrostatic repulsive force, has a following problem. The dispersion of the self-dispersible pigment is likely to become unstable when the ink co-exists with salts, and when the self-dispersible pigment makes contact with a dye color ink having a structure of salt, the aggregation of pigment occurs, which in turn causes a clog-up of the nozzle and consequently a discharge failure.

In addition, when a permeating agent such as water-soluble polyvalent alcohol alkyl ether and a surfactant are used to adjust the permeability of the ink for ink-jet recording into the paper, the following problem may occur although the cause therefor is unknown. Namely, the aggregation is likely to occur when a black ink and a color ink make contact with each other. Therefore, there is a possibility in some cases that the aggregation of pigment occurs to cause a clog-up of the nozzle and consequently the discharge failure.

As explained above, when the ink-jet recording is performed on a regular paper as the recording paper, it has been quite difficult to realize both of the suppression of bleeding and the stable discharge.

SUMMARY OF THE INVENTION

The present invention has been made in order to solve the above problems, an object of which is to provide an ink set for ink-jet recording in which the bleeding hardly occurs and which also exhibits a satisfactory discharge stability even when ink-jet recording is performed on a regular paper.

The inventors discovered that the above object can be achieved by using the combination of a black ink for ink-jet recording containing a negatively-chargeable and self-dispersible pigment and a color ink containing a dye having a specific fluorescein structure in which entire molecule is uniformly charged to have a negative electric charge. Thus, the inventors have completed the present invention.

According to a first aspect of the present invention, there is provided a water base ink set for ink-jet recording comprising:

a black ink containing water, a black pigment, and a water-soluble organic solvent; and a color ink containing water, a dye, an alkylamine ethylene oxide adduct and a water-soluble organic solvent, wherein:

the black pigment is a negatively-chargeable and self-dispersible pigment;

the dye has a fluorescein structure represented by the following formula (1);

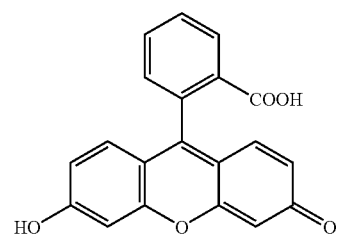

(1)

the alkylamine ethylene oxide adduct is represented by the following formula (2),

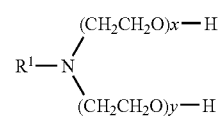

(2)

in which $R^1$ represents an alkyl group having a number of carbons of 8 to 18, x and y are integers of not less than 1, respectively, and the sum of x and y is 5 to 15; and the water-soluble organic solvent contained in the black ink and the water-soluble organic solvent contained in the color ink are same.

The ink set for ink-jet recording of the present invention uses the combination of the black ink for ink-jet recording containing the negatively-chargeable and self-dispersible pigment and the color ink containing the dye having the specific fluorescein structure which allows the entire molecule therewith to be uniformly and negatively charged. Accordingly, when an ink-jet recording is performed on a regular paper using the ink set for ink-jet recording of the present invention, not only the bleeding hardly occurs but also satisfactory discharge stability is obtained.

According to a second aspect of the present invention, there is provided a water base ink set for ink-jet recording comprising:

a black ink containing water, a negatively-chargeable and self-dispersible pigment of black color, and a water-soluble organic solvent; and a color ink containing water, a dye having a dipole moment of not more than 20 debye, an alkylamine ethylene oxide adduct and a water-soluble organic solvent, wherein:

the alkylamine ethylene oxide adduct is represented by the following formula (2),

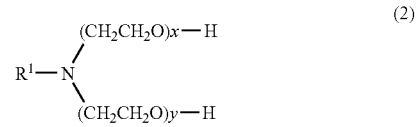

in which $R^1$ represents an alkyl group having a number of carbons of 8 to 18, x and y are integers of not less than 1, respectively, and the sum of x and y is 5 to 15; and the water-soluble organic solvent contained in the black ink and the water-soluble organic solvent contained in the color ink are same.

The ink set for ink-jet recording according to the second aspect of the present invention uses the combination of the black ink containing the negatively-chargeable and self-dispersible pigment and the color ink containing the dye having a dipole moment of specific value which allows the entire molecule of the dye to be uniformly and negatively charged. Accordingly, the bleeding is suppressed and the stable discharge is obtained.

According to a third aspect of the present invention, there is provided a method for producing a water base ink set for ink-jet recording having a black ink and a color ink, the method comprising:

preparing a black ink containing water, a black pigment and a water-soluble organic solvent; and preparing a color ink containing water, a dye, a water-soluble organic solvent and an alkylamine ethylene oxide adduct, wherein:

the black pigment is a negatively-chargeable and self-dispersible pigment;

the dye is a dye having a fluorescein structure represented by the following formula (1);

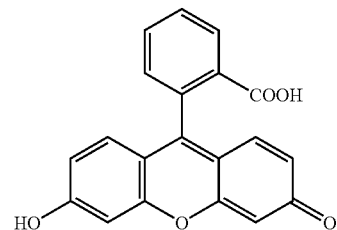

the alkylamine ethylene oxide adduct is represented by the following formula (2),

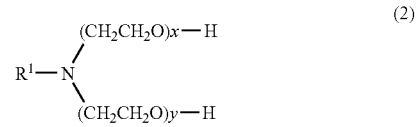

in which $R^1$ represents an alkyl group having a number of carbons of 8 to 18, x and y are integers of not less than 1, respectively, and the sum of x and y is 5 to 15; and the water-soluble organic solvent contained in the black ink and the water-soluble organic solvent contained in the color ink are same.

DESCRIPTION OF THE PREFERRED EMBODIMENTS

Figure 1:
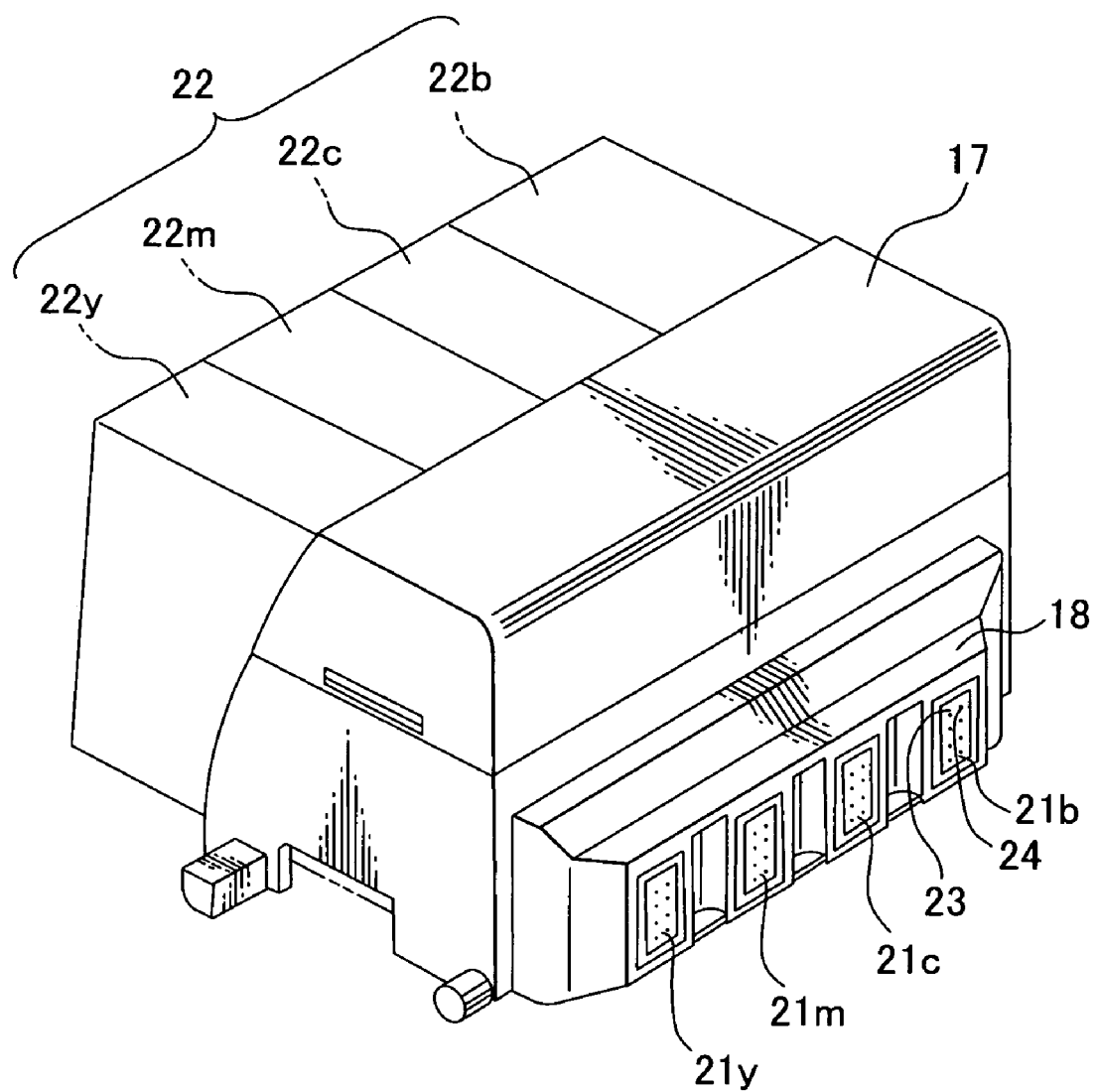
FIG. 1 shows an ink jet head which ejects four color inks and is provided with an ink cartridge in accordance with the invention.

The present invention will be explained in further detail below as exemplified by Examples.

The ink set for ink-jet recording of the present invention is constituted at least of a black ink and a color ink. The black ink contains water, a black pigment, a water-soluble organic solvent such as a moistening agent and a permeating agent, and the color ink contains water, a dye, an alkylamine ethylene oxide adduct and a water-soluble organic solvent such as a moistening agent and a permeating agent.

As the black pigment contained in the black ink, a negatively-chargeable and self-dispersible pigment is used in which non-uniform blurring hardly occurs and with which the ink is hardly solidified even when the water content in the ink is decreased after the evaporation of water. Particles of such a self-dispersible pigment are charged to have negative electric charge and are stably dispersed in the ink by the electrostatic repulsive force among the particles. Consequently, there is little need to use the dispersing agent and the surfactant which would otherwise cause the bleeding and the solidification of the ink. As such a negatively-chargeable and self-dispersible black pigment, it is preferable to use a pigment having a functional group, such as a sulfonic acid group or a carboxyl group, which provide the dispersibility to the surface of hydrophobic hydrocarbon. The pigment is not specifically limited, and may include, for example, CAB-O-JET 200 and CAB-O-JET 300 (produced by Cabot).

The content of the self-dispersible pigment in the black ink, as the pigment solid content is preferably 0.5 to 20% by weight, more preferably 1 to 12% by weight, and much more preferably 2 to 8% by weight with respect to the total amount of the ink for the following reason. If the content is small like less than 0.5% by weight, there is a possibility that sufficient OD value cannot be obtained. If the content is great like more than 20% by weight, there is a possibility that the ink is solidified when the water content in the ink is decreased after the evaporation of water.

On the other hand, the present invention uses a dye, which has a fluorescein structure represented by the foregoing formula (1) and functions to prevent the aggregation of the self-dispersible black pigment used in the black ink, as the dye for the color ink. The reason that the dye having the fluorescein structure represented by the formula (1) exhibits the function of preventing the aggregation of the self-dispersible black pigment is explained with reference to the states of Color Index Number (C.I.) Acid Red 92 before and after dissociation as exemplified below.

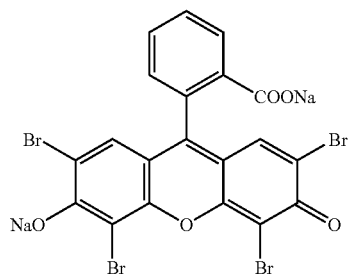

C. I. Acid Red 92 before dissociation

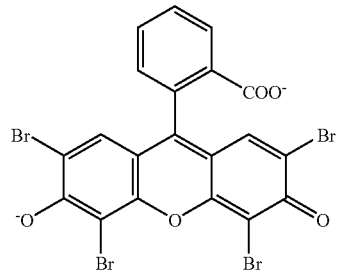

C. I. Acid Red 92 after dissociation

Namely, when a dye molecule such as C.I. Acid Red 92 having a fluorescein structure is dissolved in the water and dissociated, dissociative groups (—COO$^-$ and —O$^-$ in C.I. Acid Red 92 after dissociation) are located at positions substantially symmetrical with respect to the center of the molecule, and thus the dipole moment is small since the forces canceling localizations in electric charges are exerted on each other. Accordingly, a state is established in which the entire dye molecule is uniformly charged with a negative electric charge (a state in which the localization in electric charge is small, namely the polarity is low). It is considered that the dye having such a chemical structure enters more easily between the self-dispersible pigments than a dye having a high polarity after dissociation. In addition, it is considered that when a dye dissociated in this manner enters between the self-dispersible pigments charged to have a negative electric charge, the dye exhibits the electric repulsive reaction which prevents the pigment particles from aggregating with each other.

In addition, a benzene ring, which is rotatably connected to the dibenzopyran structure in the fluorescein structure in single bond perpendicularly thereto, increases the bulkiness of the dye. Therefore, it is considered that once a dye having the fluorescein structure enters between the self-dispersible pigments, the dye acts as a steric hindrance which prevents the pigments (pigment particles) from approaching closely toward each other, thereby preventing the aggregation of the pigments. Accordingly, it is considered that the dye having the fluorescein structure is more effective in preventing the aggregation of negatively-chargeable and self-dispersible pigments than other dyes, due to the above-described polarity and steric structure of the dye.

Examples of a preferred dye having such a fluorescein structure represented by the formula (1) may include, but not limited to, magenta dyes such as C.I. Acid Red 52, C.I. Acid Red 87 and C.I. Acid Red 92. Dyes of different colors such as orange and yellow which have the structure represented by the formula (1) are also encompassed in the dye used in the ink set of the present invention. The dipole moments of these magenta dyes are 19.0 debye for C.I. Acid Red 52, 10.0 debye for C.I. Acid Red 87, and 10.2 debye for C.I. Acid Red 92, all of which are not more than 20 debye. Accordingly, when selecting the dye in view of dipole moment, it is desired to select a dye having a dipole moment of not more than 20 debye. The dipole moments as described above were measured with the calculation method AM1 in the software for molecular orbital calculation (Win MOPAC V1.0 for Windows 95/NT3.51 produced by Fujitsu Ltd.)

The dye having the fluorescein structure represented by the formula (1) may be used singly, or two or more of the dyes may be used in combination. The content of the dye having the fluorescein structure represented by the formula (1) in the color ink, as the dye solid content, is preferably 1 to 5% by weight, and more preferably 2 to 4% by weight with respect to the total amount of the ink for the following reason. If the content is small like less than 1% by weight, there is a possibility that any sufficient color vividness or brightness and any sufficient optical density value (OD value) cannot be obtained. If the content is great like more than 5% by weight, there is a possibility that the amount of positive ions as counter ion derived from the dye is increased. In this case, when the color ink makes contact with the black ink, the positive ions may lower the electric potential on the surfaces of the self-dispersible pigments contained in the black ink, thereby destabilizing the dispersion of pigment and causing the aggregation.

In the present invention, the color ink is added with the alkylamine ethylene oxide adduct represented by the foregoing formula (2). The alkylamine ethylene oxide adduct represented by the formula (2) has appropriate surface action function and thus can provide sufficient permeability to the color ink. In addition, the alkylamine ethylene oxide adduct represented by the formula (2) has a structure in which two hydrophilic ethylene oxide groups and one hydrophobic alkyl group are bonded to a nitrogen atom, and thus easily dissolves in the water. When dissolved in the water, this alkylamine ethylene oxide adduct functions as an organic base and extracts hydrogen from a water molecule. In addition, the alkylamine ethylene oxide adduct itself is charged to have a δ+ charge, and the solution thereof exhibits alkalinity. Accordingly, the alkylamine ethylene oxide adduct represented by the formula (2) stabilizes the dye in the ink which has the fluorescein structure represented by the formula (1) and is structurally an anionic water-soluble dye.

On the other hand, the printing surface of recording paper (printing paper) generally used for the ink-jet printer is acidic or neutral. Therefore, the moment the color ink containing the alkylamine ethylene oxide adduct represented by the formula (2) makes contact with the paper surface, the stability of the dye in the color ink is lowered due to the difference in pH between the printing surface and the ink, and the deposition of the dye occurs in some cases. The dye, which has been deposited once, sufficiently entwines with the fibers of the recording paper. Accordingly, when the alkylamine ethylene oxide adduct represented by the formula (2) having both of the permeability and the liquid property is blended into the color ink containing the dye having the fluorescein structure represented by the formula (1), then the color ink appropriately permeates into the paper fibers and the dye entwines with the paper fibers, thereby preventing the bleeding in the printing boundary portion between the color and black inks. Thus, it is possible to maintain a high printing quality.

In the formula (2), a straight chained alkyl group, a branched alkyl group and a cyclic alkyl group may be used as the alkyl group in which $R^1$ has a number of carbons of 8 to 18. In the formula (2), the sum of x and y is integer of 5 to 15, and x and y are integers of not less than 1, respectively. The alkylamine ethylene oxide adducts of the formula (2) may be a mixture or composition thereof. Such an alkylamine ethylene oxide adduct represented by the formula (2) is not specifically limited, and may include, for example, ETHOMEEN C/15 (x+y=5), ETHOMEEN S/25 (x+y=15), ETHOMEEN T/15 (x+y=5), and ETHOMEEN C/25 (x+y=15) (respectively produced by Lion Co. Ltd.). ETHOMEENs (product name) are in a form of a mixture or composition of compounds (ethylene oxide condensation products of the primary fatty amines) represented by the formula (2) and each having a different number of carbons. For example, ETHOMEEN C/15 is a mixture of the compounds represented by the formula (2) in which x+y=5 and $R^1$=C8 to C18, and is derived from coconut oil.

In the present invention, the content of the alkylamine ethylene oxide adduct represented by the formula (2) in the color ink, with respect to the solid content of the dye having the fluorescein structure represented by the formula (1), is preferably 5 to 20% by weight, and more preferably 6 to 10% by weight for the following reason. If the content is small like less than 5% by weight, there is a possibility that the dye does not sufficiently entwine with the paper fibers of recording paper and any sufficient permeating action cannot be obtained. If the content is great like more than 20% by weight, there is a problem such that the deposition of the dye occurs and the ink is solidified when the water content in the ink is decreased after the evaporation of water. In addition, there is a possibility that the dispersion of the pigment in the black ink is destroyed when the black ink and the color ink make contact with each other.

The black ink and the color ink, constituting the ink set for ink-jet recording of the present invention respectively, contain the same water-soluble organic solvent in addition to water. It is desired that the water-soluble organic solvent contains a moistening agent which functions to prevent the ink from drying up at the tip portion of the recording head and a permeating agent which makes the ink permeates into the recording paper. In the present invention, the moistening agent used in the black ink is preferably same as that used in the color ink, and the permeating agent used in the black ink is preferably same as that used in the color ink, for the following reason. When the black ink and the color ink which are different in moistening and permeating agents contained therein make contact with each other, the hydration or water-soluble state of the counter ion in the self-dispersible pigment contained in the black ink is changed due to the difference in hydrophilic and hydrophobic properties possessed by the moistening and permeating agents respectively. Consequently, the state of electric charge of counter ions in the self-dispersible pigment is varied, and the dispersion state, which has been stable so far, is also changed. As a result, the self-dispersible pigments approaches to each other too closely, thus creating a state in which the aggregation is likely to occur, and causing the aggregation of the pigment (such a phenomenon is hereinafter called as "solvent shock"). Consequently, there is a possibility that the discharge failure is caused due to the clog-up of the nozzle or the like. On the other hand, when the same water-soluble organic solvents, specifically the same moistening agents and the same permeating agents, are used in the black and color inks, the major components of the solvents contained in the black and color inks are composed of substances having the nearly same chemical structure. Accordingly, it is possible to enhance the effect of reducing the solvent shock which would otherwise trigger the aggregation of the pigment in the black ink when the black and color inks contact with each other.

The moistening agent preferably used in the black and color inks includes, for example, water-soluble polyvalent alcohol. The moistening agent is not specifically limited and may include, for example, polyalkylene glycols such as polyethylene glycol; alkyelene glycols such as ethylene glycol, propylene glycol, butylene glycol, diethylene glycol, dipropylene glycol, triethylene glycol, tripropylene glycol, 1,2,6-hexanetriol, thiodiglycol, 1,3-butanediol, 1,5-pentanediol and hexylene glycol; and glycerol. These water-soluble polyvalent alcohols may be used singly, or two or more of the water-soluble polyvalent alcohols may be used in combination.

The content of the water-soluble polyvalent alcohol in the black and color inks, respectively, is preferably 5 to 50% by weight, more preferably 7 to 40% by weight, and much more preferably 10 to 35% by weight with respect to the total amount of the respective inks for the following reason. If the content is small like less than 5% by weight, there is a possibility that any sufficient moistening function cannot be obtained, which in turn causes the problems such that the ink is solidified or the deposition of dye occurs when the water content in the ink is decreased after the evaporation of water. If the content is great like more than 50% by weight, this may cause problems such that the viscosity of the ink becomes too high and any normal ink ejection cannot be performed, and the ink dries too slowly on the recording paper.

The permeating agent preferably used in the black and color inks includes, for example, water-soluble polyvalent alcohol alkyl ether. The permeating agent is not specifically limited and may include, for example, diethylene glycol monomethyl ether, diethylene glycol monobutyl ether, diethylene glycol monoisobutyl ether, dipropylene glycol monomethyl ether, dipropylene glycol monopropyl ether, dipropylene glycol monoisopropyl ether, dipropylene glycol monobutyl ether, triethylene glycol monomethyl ether, triethylene glycol monobutyl ether, tripropylene glycol monomethyl ether, and tripropylene glycol monobutyl ether. These water-soluble polyvalent alcohol alkyl ethers may be used singly, or in a mixture of any combination thereof.

The content of the permeating agent such as water-soluble polyvalent alcohol alkyl ether in the black ink is preferably 0.05 to 5% by weight, and more preferably 1 to 2% by weight with respect to the total amount of the black ink for the following reason. If the content is small like less than 0.05% by weight, the speed at which the ink permeates into the paper becomes slow, which in turn causes problems such that the drying time becomes too long, the ink exists as liquid on the paper too long, and the ink is more likely to mix with the ink of different color, thereby causing the bleeding. If the content is great like more than 5% by weight, the speed at which the ink permeates into the paper becomes great and the ink blurs too much, which in turn causes problems such that the bleeding occurs at the boundary portion with the color ink, and the OD value is lowered. In addition, when the water content in the black ink is decreased after the evaporation of water, the solubility of the water-soluble polyvalent alcohol alkyl ether is deteriorated to cause the separation in the ink liquid.

On the other hand, the content of the permeating agent such as water-soluble polyvalent alcohol alkyl ether in the color ink is preferably 1 to 6% by weight, and more preferably 2 to 4% by weight with respect to the total amount of the ink for the following reason. If the content is small like less than 1% by weight, the speed at which the ink permeates into the paper becomes slow, which in turn causes problems such that the drying time becomes too long, the ink exists as liquid on the paper too long, and the ink is more likely to mix with the ink of different color, thereby causing the bleeding. If the content is great like more than 6% by weight, the speed at which the ink permeates into the paper becomes great and the ink blurs too much, which in turn causes problems such that the bleeding occurs at the boundary portion with the black ink, and, when the water content in the color ink is decreased after the evaporation of water, the solubility of the water-soluble polyvalent alcohol alkyl ether is deteriorated to cause the separation in the ink liquid.

In the present invention, the content of the permeating agent such as water-soluble polyvalent alcohol alkyl ether in the black ink is smaller than the content of the permeating agent such as water-soluble polyvalent alcohol alkyl ether in the color ink, and it is desired that the former is 20 to 50% by weight with respect to the latter. This is because when the content of the permeating agent such as water-soluble polyvalent alcohol alkyl ether in the black ink is greater than the content of the permeating agent such as water-soluble polyvalent alcohol alkyl ether in the color ink, the speed at which the black ink permeates into the recording paper is greater than the speed at which the color ink permeates into the recording paper, then the black ink leaks into the portion printed with the color ink, thereby causing the problem of bleeding.

The water used in the ink set for ink-jet recording of the present invention is preferably deionized water (pure water). The content of the water is preferably not less than 40% by weight with respect to the total amount of the inks each constituting the ink set for ink-jet recording, so that the viscosity of the ink under the ordinary condition is maintained to be low with which a normal discharge of the ink can be performed.

The basic constituents of the ink set for ink-jet recording of the present invention has been explained as above. Other than these constituents, it is possible to add viscosity-adjusting agents, surface tension-adjusting agent, pH-adjusting agents, and antiseptic/fungicidal agents or the like, as necessary. In addition, other moistening agents and permeating agents other than the above-described agents may be used.

The ink set for ink-jet recording of the present invention may be produced by selecting a negatively-chargeable and self-dispersible pigment as the black pigment when preparing the black ink; selecting a compound having a fluorescein structure represented by the formula (1) as the dye when preparing the color ink; blending an alkylamine ethylene oxide adduct represented by the formula (2) into the color ink; and selecting a moistening agent contained in the black ink which is same as a moistening agent contained in the color ink and selecting a permeating agent contained in the black ink which is same as a permeating agent contained in the color ink, thereby mixing and preparing the black and color inks respectively by the ordinary method.

In the ink set for ink-jet recording of the present invention, which can be obtained as described above, the problems in the conventional art have been sufficiently solved. Accordingly, no problems occur such as the aggregation of the pigment dispersed in the black ink, which would otherwise occur when the black and color inks make contact with each other, and the clog-up of the nozzle. In addition, the anti-bleeding quality in the printing boundary portion between the black and color inks is satisfactory. The ink set for the ink-jet recording of the present invention may be applied to various kinds of the method for discharging ink droplets (the electrostatic suction method, the vibration method using piezoelectric elements, the thermal method utilizing bubbles or the like). The ink set can be most preferably applied to the vibration method using the piezoelectric elements.

DESCRIPTION OF THE PREFERRED EMBODIMENTS

The ink set for ink-jet recording according to the present invention will be explained below as embodied by Examples. In the examples, the numeric values indicate values represented by "% by weight".

EXAMPLE 1

A black ink was prepared by blending a self-dispersible black pigment (product name: CAB-O-JET 300 produced by Cabot, pigment solid content: 15% by weight), a moistening agent (glycerol and polyethylene glycol (average molecular weight: 200)), a permeating agent (dipropylene glycol propyl ether), and pure water in blending amounts respectively indicated in Table 1, followed by being uniformly mixed to obtain a mixture thereof. The mixture is then filtrated through a membrane filter of 2.5 μm. Thus, the black ink was prepared.

A magenta ink was prepared by blending a water-soluble magenta dye having a fluorescein structure (C.I. Acid Red 87), a moistening agent (glycerol and polyethylene glycol (average molecular weight: 200)), a permeating agent (dipropylene glycol propyl ether), a surfactant (ETHOMEEN C/15 (produced by Lion Co. Ltd.; $R^1$=C 8 to 18, x+y=5 in the formula (2)) and pure water in blending amounts respectively indicated in Table 1, followed by being uniformly mixed to obtain a mixture thereof. The mixture is then filtrated through a membrane filter of 2.5 μm. Thus, the magenta ink was prepared.

TABLE 1

| Ink Set of Example 1 | Black Ink (% by weight) | Magenta Ink (% by weight) |
|---|---|---|
| CAB-O-JET 300 (produced by Cabot) | 33.0 | — |
| glycerol | 25.0 | 28.0 |
| polyethylene glycol (average molecular weight: 200) | 7.0 | 6.0 |
| dipropylene glycol propyl ether | 1.0 | 2.5 |
| ETHOMEEN C/15 (produced by Lion) | — | 0.2 |
| C.I. Acid Red 87 | — | 3.0 |
| pure water | balance | balance |

EXAMPLE 2

A black ink was prepared by blending a self-dispersible black pigment (product name: CAB-O-JET 300 produced by Cabot, pigment solid content: 15% by weight), a moistening agent (glycerol and diethylene glycol), a permeating agent (triethylene glycol-n-butyl ether and tripropylene glycol-n-butyl ether), and pure water in blending amounts respectively indicated in Table 2 respectively, followed by being uniformly mixed to obtain a mixture thereof. The mixture is then filtrated through a membrane filter of 2.5 μm. Thus, the black ink was prepared.

A magenta ink was prepared by blending a water-soluble magenta dye having a fluorescein structure (C.I. Acid Red 52), a moistening agent (glycerol and diethylene glycol), a permeating agent (triethylene glycol-n-butyl ether and tripropylene glycol-n-butyl ether), a surfactant (ETHOMEEN S/15 (produced by Lion Co. Ltd.; $R^1$=C 14 to 18, x+y=5 in the formula (2)) and pure water in blending amounts respectively indicated in Table 2, followed by being uniformly mixed to obtain a mixture thereof. The mixture is then filtrated through a membrane filter of 2.5 μm. Thus, the magenta ink was prepared.

TABLE 2

| Ink Set of Example 2 | Black Ink (% by weight) | Magenta Ink (% by weight) |
|---|---|---|
| CAB-O-JET 300 (produced by Cabot) | 33.0 | — |
| glycerol | 28.0 | 28.0 |
| diethylene glycol | 4.0 | 5.0 |
| triethylene glycol-n-butyl ether | 0.5 | 3.0 |
| tripropylene glycol-n-butyl ether | 0.2 | 0.2 |
| ETHOMEEN S/15 (produced by Lion) | — | 0.2 |
| C.I. Acid Red 52 | — | 2.5 |
| pure water | balance | balance |

EXAMPLE 3

A black ink was prepared by blending a self-dispersible black pigment (product name: CAB-O-JET 200 produced by Cabot, pigment solid content: 15% by weight), a moistening agent (glycerol), a permeating agent (dipropylene glycol propyl ether), and pure water in blending amounts respectively indicated in Table 3, followed by being uniformly mixed to obtain a mixture thereof. The mixture is then filtrated through a membrane filter of 2.5 μm. Thus, the black ink was prepared.

A magenta ink was prepared by blending a water-soluble magenta dye having a fluorescein structure (C.I. Acid Red 87 and C.I. Acid Red 92), a moistening agent (glycerol), a permeating agent (dipropylene glycol propyl ether), a surfactant (ETHOMEEN C/25) (produced by Lion Co. Ltd.; $R^1$=C 8 to 18, x+y=15 in the formula (2)) and pure water in blending amounts indicated in Table 3 respectively, followed by being uniformly mixed to obtain a mixture of thereof. The mixture is then filtrated through a membrane filter of 2.5 μm. Thus, the magenta ink was prepared.

TABLE 3

| Ink Set of Example 3 | Black Ink (% by weight) | Magenta Ink (% by weight) |
|---|---|---|
| CAB-O-JET 200 (produced by Cabot) | 33.0 | — |
| glycerol | 31.0 | 32.0 |
| dipropylene glycol propyl ether | 1.0 | 3.0 |
| ETHOMEEN C/25 (produced by Lion) | — | 0.15 |
| C.I. Acid Red 87 | — | 1.5 |
| C.I. Acid Red 92 | — | 1.0 |
| Pure water | balance | balance |

COMPARATIVE EXAMPLE 1

A black ink was prepared by blending a self-dispersible black pigment (product name: CAB-O-JET 300 produced by Cabot, pigment solid content: 15% by weight), a moistening agent (glycerol and polyethylene glycol (average molecular weight: 200)), and pure water in blending amounts respectively indicated in Table 4, followed by being uniformly mixed to obtain a mixture thereof. The mixture is then filtrated through a membrane filter of 2.5 μm. Thus, the black ink was prepared.

A magenta ink was prepared by blending a water-soluble magenta dye having a fluorescein structure (C.I. Acid Red 87), a moistening agent (glycerol and polyethylene glycol (average molecular weight: 200)), a permeating agent (triethylene glycol-n-butyl ether), a surfactant (ETHOMEEN C/25 (produced by Lion Co. Ltd.; $R^1$=C 8 to 18, x+y=15 in the formula (2)) and pure water in blending amounts respectively indicated in Table 4, followed by being uniformly mixed to obtain a mixture thereof. The mixture is then filtrated through a membrane filter of 2.5 μm. Thus, the magenta ink was prepared.

TABLE 4

| Ink Set of Comparative Example 1 | Black Ink (% by weight) | Magenta Ink (% by weight) |
|---|---|---|
| CAB-O-JET 300 (produced by Cabot) | 33.0 | — |
| glycerol | 26.0 | 21.0 |
| polyethylene glycol (average molecular weight: 200) | 7.0 | 8.0 |
| triethylene glycol-n-butyl ether | — | 5.0 |
| ETHOMEEN C/25 (produced by Lion) | — | 0.2 |
| C.I. Acid Red 87 | — | 3.0 |
| pure water | balance | balance |

COMPARATIVE EXAMPLE 2

A black ink was prepared by blending a self-dispersible black pigment (product name: CAB-O-JET 300 produced by Cabot, pigment solid content: 15% by weight), a moistening agent (glycerol and polyethylene glycol (average molecular weight: 200)), a permeating agent (dipropylene glycol propyl ether), and pure water in blending amounts respectively indicated in Table 5, followed by being uniformly mixed to obtain a mixture thereof. The mixture is then filtrated through a membrane filter of 2.5 μm. thus, the black ink was prepared.

A magenta ink was prepared by blending a water-soluble magenta dye without fluorescein structure (C.I. Acid Red 294, dipole moment: 35.8 debye), a moistening agent (glycerol and polyethylene glycol (average molecular weight: 200)), a permeating agent (dipropylene glycol propyl ether), a surfactant (ETHOMEEN C/15 (produced by Lion Co. Ltd.; $R^1$=C 8 to 18, x+y=5 in the formula (2)) and pure water in blending amounts respectively indicated in Table 5, followed by being uniformly mixed to obtain a mixture thereof. The mixture is then filtrated through a membrane filter of 2.5 μm. Thus, the magenta ink was prepared.

TABLE 5

| Ink Set of Comparative Example 2 | Black Ink (% by weight) | Magenta Ink (% by weight) |
|---|---|---|
| CAB-O-JET 300 (produced by Cabot) | 33.0 | — |
| glycerol | 25.0 | 26.0 |
| polyethylene glycol (average molecular weight: 200) | 7.0 | 6.0 |
| dipropylene glycol propyl ether | 1.0 | 2.0 |
| ETHOMEEN C/15 (produced by Lion) | — | 0.2 |
| C.I. Acid Red 294 | — | 3.0 |
| pure water | balance | balance |

COMPARATIVE EXAMPLE 3

A black ink was prepared by blending a self-dispersible black pigment (product name: CAB-O-JET 200 produced by Cabot, pigment solid content: 15% by weight), a moistening agent (glycerol), a permeating agent (triethylene glycol-n-butyl ether and diethylene glycol diethyl ether), and pure water in blending amounts respectively indicated in Table 6, followed by being uniformly mixed to obtain a mixture thereof. The mixture is then filtrated through a membrane filter of 2.5 μm. Thus, the black ink was prepared.

A magenta ink was prepared by blending a water-soluble magenta dye having a fluorescein structure (C.I. Acid Red 52, dipole moment: 35.8 debye), a moistening agent (glycerol), a permeating agent (triethylene glycol-n-butyl ether and diethylene glycol diethyl ether), and pure water in blending amounts respectively indicated in Table 6, followed by being uniformly mixed to obtain a mixture thereof. The mixture is then filtrated through a membrane filter of 2.5 μm. Thus, the magenta ink was prepared.

TABLE 6

| Ink Set of Comparative Example 3 | Black Ink (% by weight) | Magenta Ink (% by weight) |
|---|---|---|
| CAB-O-JET 200 (produced by Cabot) | 33.0 | — |
| glycerol | 28.0 | 32.0 |
| diethylene glycol diethyl ether | 4.0 | 2.0 |
| triethylene glycol-n-butyl ether | 2.0 | 4.5 |
| C.I. Acid Red 52 | — | 3.0 |
| pure water | balance | balance |

COMPARATIVE EXAMPLE 4

A black ink was prepared by blending a self-dispersible black pigment (product name: CAB-O-JET 300 produced by Cabot, pigment solid content: 15% by weight), a moistening agent (glycerol and polyethylene glycol (average molecular weight: 200)), a permeating agent (triethylene glycol-n-butyl ether), and pure water in blending amounts respectively indicated in Table 7, followed by being uniformly mixed to obtain a mixture of thereof. The mixture is then filtrated through a membrane filter of 2.5 μm. Thus, the black ink was prepared.

A magenta ink was prepared by blending a water-soluble magenta dye having a fluorescein structure (C.I. Acid Red 87), a moistening agent (glycerol), a permeating agent (1,5-pentanediol and dipropylene glycol propyl ether), a surfactant (ETHOMEEN C/15 (produced by Lion Co. Ltd.; $R^1$=C 8 to 18, x+y=5 in the formula (2)) and pure water in blending amounts respectively indicated in Table 7, followed by being uniformly mixed to obtain a mixture thereof. The mixture is then filtrated through a membrane filter of 2.5 μm. Thus, the magenta ink was prepared.

TABLE 7

| Ink Set of Comparative Example 4 | Black Ink (% by weight) | Magenta Ink (% by weight) |
|---|---|---|
| CAB-O-JET 300 (produced by Cabot) | 33.0 | — |
| glycerol | 22.0 | 24.0 |
| polyethylene glycol (average molecular weight: 200) | 10.0 | — |
| 1,5-pentanediol | — | 10.0 |
| triethylene glycol-n-butyl ether | 2.5 | — |
| dipropylene glycol propyl ether | — | 3.0 |
| ETHOMEEN C/15 (produced by Lion) | — | 0.2 |
| C.I. Acid Red 87 | — | 3.0 |
| pure water | balance | balance |

Evaluation (Evaluation 1: Bleeding)

The ink sets for ink-jet recording obtained in Examples 1 to 3 and Comparative Examples 1 to 4, respectively, were subjected to the evaluation of bleeding in accordance with the following methods. Namely, the obtained water base ink sets for ink-jet recording were respectively used to perform printing of image on a recording paper (Multi USE 20 PAPER produced by Great White) by using an ink-jet printer (MFC-3100C produced by Brother Industries, Ltd.). With respect to each of the ink sets, a raggedness (rag) at the boundary portion between the black and magenta inks was measured with the method pursuant to ISO 13660. The evaluation was made based on the obtained rags in accordance with the following criteria, and the results of evaluation are shown in Table 8. In this evaluation, a ragged line or line with rag means a state in which a line heaves or is jaggy compared with an ideal line edge which should be normally smooth and straight. Accordingly, as the extent of the bleeding is smaller, the numerical value of the rag becomes smaller.

Evaluation Criteria for Bleeding:
Rank Contents
+: increase in rag in a line at a boundary portion between the black and magenta inks was less than 5 with respect to rag in a single line printed with only the black ink.
−: increase in rag in a line at a boundary portion between the black and magenta inks was not less than 5 with respect to rag in a single line printed with only the black ink.

(Evaluation 2: Aggregation of Black Pigment)

With respect to each of combinations of the black ink and magenta ink obtained in Examples and Comparative Examples, respectively, one ink droplet of the black ink and one ink droplet of the magenta ink were dropped onto a slide glass while being separated from each other. A cover glass was gently placed on the two droplets from above so that the two inks were allowed to make contact with each other beneath the cover glass. A contact area of these two droplets was observed with a microscope (OPTIPHOT produced by Nikon Corporation, magnification: ×400), and the situation of aggregation of the pigment was visually observed. The evaluation was made in accordance with the following criteria, and the obtained results are shown in Table 8.

Evaluation Criteria for Pigment Aggregation:
Rank Contents
+: No aggregation was observed in the contact area.
−: Aggregation of the black pigment in the black ink was observed in the contact area.

(Evaluation 3: Nozzle Clog-Up)

For each of the obtained water base ink sets for ink-jet recording, a continuous discharge test was carried out 3,000 times at room temperature by using an ink-jet printer (MFC-3100C produced by Brother Industries, Ltd.). For each discharge, the wiping of the head nozzle surface was performed to evaluate the nozzle clog-up in accordance with the following evaluation criteria. The obtained results are shown in Table 8. In the wiping operation of the nozzle head, nozzle arrays for discharging the black ink and the magenta ink, respectively, are wiped simultaneously in the direction that crosses the direction of the nozzle arrays. Due to the simultaneous wiping, the black ink and the magenta inks can contact with each other.

Evaluation Criteria for Wiping:
Rank Contents

+: No aggregation of the black pigment, no discharge failure and no bending of the discharged ink was observed after the wiping for the nozzle surface performed continuously 3,000 times.

−: The discharge failure and the bending of discharged ink were caused after the wiping for the nozzle surface performed continuously 3,000 times, both of the discharge failure and the bending of the discharged ink were not restored in a short period of time, and the aggregation of the black pigment in the black ink was observed in the contact area.

TABLE 8

|  | Evaluation 1: Bleeding | Evaluation 2: Aggregation of black pigment | Evaluation 3: Nozzle clog-up |
|---|---|---|---|
| Example 1 | + | + | + |
| Example 2 | + | + | + |
| Example 3 | + | + | + |
| Comp. Ex. 1 | − | + | + |
| Comp. Ex. 2 | + | − | − |
| Comp. Ex. 3 | − | + | + |
| Comp. Ex. 4 | + | − | − |

From Table 8, it is appreciated that with respect to the ink sets prepared in Examples, satisfactory results were successfully obtained in all of the evaluations. In addition, with respect to each of the inks set obtained in Examples, printing was performed on the recording paper (Multi USE 20 PAPER produced by Great White) while combining each of the ink sets of Examples with the cyan and yellow inks contained in the cartridges of MFC-300C produced by Brother Industries, Ltd. In this case also, the results of printing were satisfactory for the respective ink sets obtained in Examples.

On the other hand, with respect to Comparative Example 1, the evaluation of bleeding was not good because the permeating agent used in the magenta ink was not used in the black ink. With respect to Comparative Example 2, the aggregation of black pigment and the nozzle clog-up occurred because a dye without the fluorescein structure was used as the magenta dye. With respect to Comparative Example 3, the bleeding evaluation was not good because no alkylamine ethylene oxide adduct was contained. With respect to Comparative Example 4, the aggregation of black pigment and the nozzle clog-up occurred because the black ink and magenta ink were different from each other in composition of the moistening agent and the permeating agent.

In the foregoing examples, the magenta ink containing a magenta dye was indicated as an example of color ink. However, other than the magenta ink, it is possible use a color ink containing a dye having the fluorescein structure represented by the formula (1). Although the moistening and permeating agents were used as the water soluble organic solvent, any water soluble organic solvent, regardless of functional name thereof, may be applied to the ink set of the present invention.

The ink set of the present invention also encompasses a single cartridge case having compartments each accommodating the black ink and the color ink in a separate manner or a set of cartridge cases each of which independently accommodates the black ink or the color ink. In addition, an ink set having the black ink and a plurality of color inks is encompassed in the present invention. In this case, at least one color ink among the color inks needs to satisfy the relationship defined in the present invention. Accordingly, an ink set including a black ink, a magenta ink, a cyan ink and a yellow ink and an ink set having color inks of not less than 4 colors are exemplified as such the ink set.

An embodiment of an ink cartridge which contains the water base ink set in accordance with the invention is shown in FIG. 1. The ink cartridge 22 has four compartments 22b, 22c, 22m, 22y which contain the black ink, cyan ink, magenta ink and yellow ink, among which the black ink and the magenta ink are prepared as those prepared in the examples. The compartment 22b, 22c, 22m, 22y may be formed integrally or independently. The ink cartridge 22 is removably installed on an ink jet head 18. The ink jet head 18 has nozzle heads 21b, 21c, 21m, 21y which communicate with the compartment 22b, 22c, 22m, 22y to eject the black ink, cyan ink, magenta ink and yellow ink, respectively. A plurality of nozzles 24 are formed on the surface 23 of each nozzle head. The ink jet head is typically mounted on a carriage 17 which moves on and along a surface of a recording sheet.

The ink set for ink-jet recording of the present invention uses the combination of the black ink for ink-jet recording containing the negatively-chargeable and self-dispersible black pigment and the color ink containing the dye having the specific fluorescein structure, in which entire molecule is uniformly charged to have a negative electric charge. Accordingly, when an ink-jet recording is performed on a regular paper with the ink set for ink-jet recording of the present invention, not only the bleeding hardly occurs, but also the discharge stability is obtained. Thus, it is possible to perform an ink-jet recording in which a low cost, and high-quality and stable printing with high reliability are realized.

What is claimed is:

1. A water base ink set for ink-jet recording comprising:
a black ink containing water, a black pigment, and a water-soluble organic solvent; and
a color ink containing water, a dye, an alkylamine ethylene oxide adduct and a water-soluble organic solvent, wherein:
the black pigment is a negatively-chargeable and self-dispersible pigment;
the dye has a fluorescein structure represented by the following formula (1);

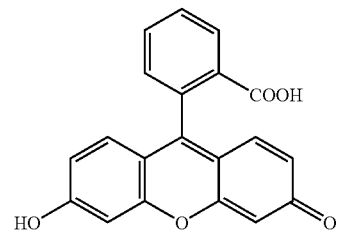

(1)

the alkylamine ethylene oxide adduct is represented by the following formula (2),

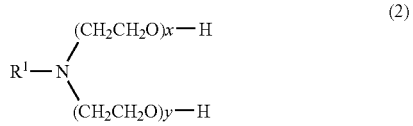

in which R¹ represents an alkyl group having a number of carbons of 8 to 18, x and y are integers of not less than 1, respectively, and the sum of x and y is 5 to 15; and a water-soluble organic solvent contained in the black ink and a water-soluble organic solvent contained in the color ink are same, and the water-soluble organic solvent contained in the black ink and the water-soluble organic solvent contained in the color ink include a permeating agent, where the permeating agent contained in the black ink is present in an amount of from 20 to 50 percent by weight of the permeating agent contained in the color ink.

2. The water base ink set for ink-jet recording according to claim 1, wherein the water-soluble organic solvent contained in the black ink and the water-soluble organic solvent contained in the color ink include a moistening agent, a moistening agent contained in the black ink and a moistening agent contained in the color ink are same, and a permeating agent contained in the black ink and a permeating agent contained in the color ink are same.

3. The water base ink set for ink-jet recording according to claim 2, wherein a content of the permeating agent in the black ink is 0.05 to 5% by weight; a content of the permeating agent in the color ink is 1 to 6% by weight.

4. The water base ink set for ink-jet recording according to claim 2, wherein the moistening agent is a water-soluble polyvalent alcohol, and the permeating agent is a water-soluble polyvalent alcohol alkyl ether.

5. The water base ink set for ink-jet recording according to claim 1, wherein the dye is a magenta dye.

6. The water base ink set for ink-jet recording according to claim 5, wherein the color ink contains the alkylamine ethylene oxide adduct represented by the formula (2) by a ratio of 5 to 20% by weight to the dye having the fluorescein structure represented by the formula (1).

7. The water base ink set for ink-jet recording according to claim 1, wherein a dipole moment of the dye is not more than 20 debye.

8. The water base ink set for ink-jet recording according to claim 1, wherein the ink set is an ink cartridge.

9. A water base ink set for ink-jet recording comprising:
a black ink containing water, a negatively-chargeable and self-dispersible pigment of black color and a water-soluble organic solvent; and
a color ink containing water, a dye having a dipole moment of not more than 20 debye, an alkylamine ethylene oxide adduct and a water-soluble organic solvent, wherein:
the alkylamine ethylene oxide adduct is represented by the following formula (2),

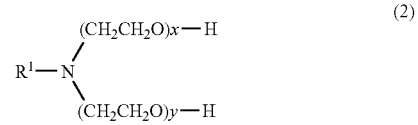

in which R¹ represents an alkyl group having a number of carbons of 8 to 18, x and y are integers of not less than 1, respectively, and the sum of x and y is 5 to 15; and a water-soluble organic solvent contained in the black ink and a water-soluble organic solvent contained in the color ink are same, and the water-soluble organic solvent contained in the black ink and the water-soluble organic solvent contained in the color ink include a permeating agent, where the permeating agent contained in the black ink is present in an amount of from 20 to 50 percent by weight of the permeating agent contained in the color ink.

10. The water base ink set for ink-jet recording according to claim 9, wherein the water-soluble organic solvent contained in the black ink and the water-soluble organic solvent contained in the color ink include a moistening agent, a moistening agent contained in the black ink and a moistening agent contained in the color ink are same, and a permeating agent contained in the black ink and a permeating agent contained in the color ink are same.

11. The water base ink set for ink-jet recording according to claim 10, wherein a content of the permeating agent in the black ink is 0.05 to 5% by weight; a content of the permeating agent in the color ink is 1 to 6% by weight.

12. The water base ink set for ink-jet recording according to claim 10, wherein the moistening agent is a water-soluble polyvalent alcohol, and the permeating agent is a water-soluble polyvalent alcohol alkyl ether.

13. The water base ink set for ink-jet recording according to claim 9, wherein the dye is a magenta dye.

14. The water base ink set for ink-jet recording according to claim 9, wherein the ink set is an ink cartridge.

15. A method for producing a water base ink set for ink-jet recording having a black ink and a color ink, the method comprising:
preparing a black ink containing water, a black pigment and a water-soluble organic solvent;
preparing a color ink containing water, a dye, a water-soluble organic solvent and an alkylamine ethylene oxide adduct, wherein:
the black pigment is a negatively-chargeable and self-dispersible pigment;
the dye is a dye having a fluorescein structure represented by the following formula (1);

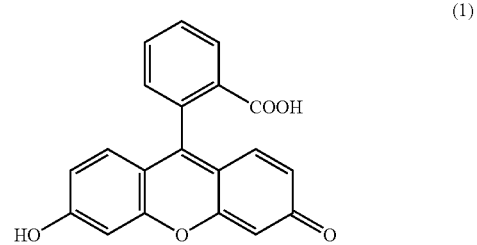

the alkylamine ethylene oxide adduct is represented by the following formula (2),

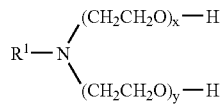

in which R¹ represents an alkyl group having a number of carbons of 8 to 18, x and y are integers of not less than 1, respectively, and the sum of x and y is 5 to 15; and a water-soluble organic solvent contained in the black ink and a water-soluble organic solvent contained in the color ink are same, and the water-soluble organic solvent contained in the black ink and the water-soluble organic solvent contained in the color ink include a permeating agent, where the permeating agent contained in the black ink is present in an amount of from 20 to 50 percent by weight of the permeating agent contained in the color ink.

16. The method for producing the water base ink set according to claim 15, wherein the water-soluble organic solvent contained in the black ink and the water-soluble organic solvent contained in the color ink include a moistening agent, a moistening agent contained in the black ink and a moistening agent contained in the color ink are same, and a permeating agent contained in the black ink and a permeating agent contained in the color ink are same.

17. The method for producing the water base ink set according to claim 16, wherein a content of the permeating agent in the black ink is 0.05 to 5% by weight; a content of the permeating agent in the color ink is 1 to 6% by weight.

18. The method for producing the water base ink set according to claim 16, wherein the moistening agent is a water-soluble polyvalent alcohol, and the permeating agent is a water-soluble polyvalent alcohol alkyl ether.

19. The method for producing the water base ink set according to claim 16, wherein the dye is a magenta dye.

* * * * *